United States Patent
Chen et al.

(10) Patent No.: US 7,628,090 B2
(45) Date of Patent: Dec. 8, 2009

(54) CIRCULATION PASSAGE STRUCTURE FOR A BALL SCREW

(75) Inventors: Yan-yu Chen, Taichung (TW); Chien-wei Tsou, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 438 days.

(21) Appl. No.: 11/277,554

(22) Filed: Mar. 27, 2006

(65) Prior Publication Data

US 2007/0221003 A1 Sep. 27, 2007

(51) Int. Cl.
*F16H 1/24* (2006.01)
(52) U.S. Cl. .................................. 74/424.86
(58) Field of Classification Search ............. 74/424.86, 74/424.88, 424.87, 424.81–424.84; 384/43, 384/44, 45
See application file for complete search history.

(56) References Cited

U.S. PATENT DOCUMENTS 5,927,858 A * 7/1999 Agari ......................... 384/45
7,401,978 B2 * 7/2008 Nakano et al. ................ 384/45
2004/0211280 A1 * 10/2004 Nishimura et al. ....... 74/424.82
2004/0237686 A1 * 12/2004 Watanabe ................ 74/424.86

* cited by examiner

*Primary Examiner*—Richard W L Ridley
*Assistant Examiner*—Alan B Waits
(74) *Attorney, Agent, or Firm*—Banger Shia

(57) ABSTRACT

A circulation passage structure for a ball screw, the circulation passage structure is used to connect the helical groove and the circulation hole of the nut, so as to form a circulation path for a plurality of balls and spacers. Due to the spacers move in a manner of being clamped between two balls, the spacer inside the return path will be pushed to move inward. The degree of curvature of the inner guiding surface connected to the inner curve can be moderated by shifting outward the location of the center of the inner curve and increasing its radius of curvature. By such arrangement, the spacer will not contact the inner guiding surface when it is pushed to move inward, and the spacer can pass through the return passage easily without the problem of impacting the return passage.

2 Claims, 5 Drawing Sheets

CIRCULATION PASSAGE STRUCTURE FOR A BALL SCREW

BACKGROUND OF THE INVENTION

1. Field of the Invention

The present invention relates to the technology field of a ball screw, and more particularly to a circulation passage structure for a ball screw, wherein the radius of curvature of the return passage of the circulation passage structure is comparatively small and the cross section of the return passage is formed in the shape of an oval, so as to facilitate the passage of the balls.

2. Description of the Prior Art

In order that the balls inside a ball screw can roll smoothly and quietly, a common method is to arrange spacer between neighboring balls, so as to protect the balls from impact and abrasion damage.

The design of the size of the spacer is quite important if want to set the spacer between neighboring balls. If the spacer is too small, the spacer between two neighboring balls is likely to become loose, even worse, the spacer may fall down and jam the balls. If the spacer is too large, the outer periphery of the spacer is likely to contact the circulation passage, causing interference and affecting the operation of the balls. In this case, the size of the spacer is usually designed to be slightly smaller than the diameter of the balls. For example, U.S. Pat. No. 6,742,408 solved the aforementioned problem by restricting the size of the spacer within the range of 0.5-0.9 times the diameter of the balls.

Referring to FIG. 1, which is an illustrative view of showing an outer circulation type ball screw structure, wherein the nut 81 is drilled with a circulation passage 83 that is to be connected to the helical ball channel 82 of the screw shaft by a return pipe 84, thus forming a ball circulating path for the balls 7.

Since the outer circulation ball screw is less restricted by shape and space, the radius of curvature of the return pipe 84 can be designed to be comparatively large. In this way, setting the size of the spacer within the range of 0.5-0.9 times the diameter of the balls can effectively solve the problems of the spacer getting loose, falling down and interfering the balls, and can enable the balls 7 and the spacers 85 to move smoothly in the return pipe 84.

However, the protruding return pipe 84 is prone to be impacted and deformed by external force, causing interference with the balls and the spacers, or even worse, the balls will be jammed. Furthermore, the current trend of the design of the ball screw structure is toward miniaturization and lightweight, the circulation space that the nut can provide for the balls is relatively reduced. The screw shaft of the outer circulation ball screw is unsuitable for miniaturization, and the screw shaft without external structure comparatively meets the requirements for miniaturization and lightweight.

Referring to FIG. 2, which is an illustrative view of a conventional inner circulation ball screw structure, wherein the nut 91 is drilled with a circulation passage 92, and a return piece 93 is arranged at either end of the circulation passage 92. Each of the return pieces 93 has a return path 931 for passage of the balls 7 and the spacers 94, and such structure is disclosed in U.S. Pat. No. 6,176,149.

However, in the miniaturization design, due to the reduction in the outer diameter of the nut, the radius of curvature of the return path 931 of the return piece 93 is also reduced. After the radius of curvature of the return path 931 is reduced, the balls 7 still can roll through it. However, the spacer 94 between two neighboring balls 7 passes through the return path 931 not in a rolling manner but moves in manner of being clamped between two neighboring balls. Therefore, the spacer 94 inside the return path 931 will be pushed to move inward and will contact the inner periphery of the return path 931, as a result, the balls will be squeezed or even jammed, as shown in FIG. 3.

No technology, in the ball screw field, has been proposed to solve the problem of "the spacer contacting the inner periphery of the return path". However, some people in the technology field of the linear guideway came up with related solutions. For example, U.S. Pat. No. 6,513,977 discloses such a design of forming a chamfer at the conjunction between the return path and the linear path of the circulation path of a linear guideway, such that the interference will not occur when the spacers move from the linear path into the return path.

However, the design of the chamfer is only able to prevent the spacers from impacting the conjunction between the linear path and the return path, the spacers are still likely to contact other portions of the circulation path and cause interference. Therefore, the same applicant proposed an improved design, as disclosed in U.S. Pat. No. 6,663,285, which aims at improving the inner periphery of the return path of the linear guideway by reducing the radius of curvature of the inner periphery of the return path, the entire inner periphery of the return path retracts inward, so as to prevent the spacers from contacting the inner periphery of the return path.

It should be stressed again that the disclosures of U.S. Pat. Nos. 6,513,977 and 6,663,285 are all about linear guideway structure, and the structure used in the linear guideway will probably be unapplicable to the ball screw.

Because the return path of the linear guideway provides enough space, the return path of a linear guideway can be designed in the shape of a semicircle that has a relatively large radius of curvature, so that the semicircular return is able to joint two parallel linear paths together. Therefore, the design of the inner periphery of the return path of a linear guideway can take the form of concentric radius reduction.

However, in a ball screw, the return path is usually designed in an cassette, as shown in FIG. 4, and the cassette 6 must be designed to have a linear guide path 62, 63 arranged at both ends of the return path 61 for connecting the helical groove 64 of the nut and the return passage 65 parallel to the axial direction of the nut. Therefore, the angle between both ends of the return path 61 will be smaller than 90 degrees. In this case, if applying the method of concentric radius reduction disclosed in the U.S. Pat. No. 6,663,285 to the cassette of a ball screw, a level difference G will exist between the guide path 62, 63 of the return path 61 and the helical groove 64 and the return passage 65, as shown in FIG. 5, causing interference with the circulation of the balls, or even worse, the balls will be jammed. Therefore, the method of concentric radius reduction disclosed in the U.S. Pat. No. 6,663,285 cannot be used in the ball screw to solve the problem of the spacer contacting the inner periphery of the return path.

The present invention has arisen to mitigate and/or obviate the afore-described disadvantages.

SUMMARY OF THE INVENTION

The primary objective of the present invention is to solve the aforementioned problems by providing a circulation passage structure of a ball screw that can enable the spacer clamped between two neighboring balls to smoothly and easily pass through return passage.

To achieve the aforesaid objective, the present invention provides a ball screw comprising a screw shaft and a nut. The screw shaft and the nut each has a helical groove for accommodation of a plurality of balls and a plurality of spacers arranged between two neighboring balls, a circulation hole is formed in an axial direction of the nut, an cassette is arranged at either end of the circulation hole, and each of the cassettes includes a circulation passage structure for connecting the helical groove and the circulation hole, so that the plurality of balls and the spacers can circulate in the nut. The circulation passage structure includes a return passage and two linear guiding passages at both ends of the return passage for connecting the helical groove and the circulation hole. The return passage includes an inner guiding surface and an outer guiding surface, the inner guiding surface is connected to an inner curve, and the outer guiding surface is connected to an outer curve. A length of the inner curve is smaller than ½ circumference of the cross section of the return passage, the inner and outer curves are non-concentrically arranged and a center of the inner curve is located further from the outer curve than a center of the outer curve, so that the inner and outer curves are arranged in a non-parallel manner, and a cross section of the return passage formed by the inner guiding surface and the outer guiding surface is formed in the shape of an oval, thus the return passage will have a comparatively large cross section for allowing the spacers to pass through without contacting the inner guiding surface.

Due to the spacer passes through not in a rolling manner but moves in a manner of being clamped between two balls, the spacer in the return passage will be pushed to move inward. In this case, the inner guiding surface of the return passage must retract inward in order not to be impacted by the spacer. Our research finds that the amount of inward displacement of the spacer will increase gradually as the spacer approaches the mid of the return passage, and it will decrease again as the spacer moves away from the mid of the return passage. Therefore, the amount of inward retraction of the inner curve only needs to change in response to the amount of inward displacement of the spacer. In this case, the degree of curvature of the inner guiding surface connected to the inner curve can be moderated (the radius of curvature is comparatively small) by shifting outward the location of the center of the inner curve and increasing its radius of curvature. By such arrangement, the spacer will not contact the inner guiding surface when it is pushed to move inward, and the spacer can pass through the return passage easily without the problem of impacting the return passage.

In addition, due to the center of the inner curve moves outward and the radius of curvature thereof is increase, the cross section of the return passage formed by the inner guiding surface and the outer guiding surface will be formed in the shape of an oval. Since the outer guiding surface is mainly provided for passage of the balls, the diameter of the outer guiding surface should be at least equal to that of the balls, and the inner guiding surface can change in shapes in response to the inner curve and then is connected to the outer guiding surface. Firstly, the inner guiding surface is U-shaped in cross section so as to have a semicircular section and a linear section, a diameter of the semicircular section at least equals to that of the balls, and the semicircular section is connected to the outer guiding surface via the linear section, so that the return passage is elliptical in cross section. Secondly, cross section of the outer guiding surface is arc-shaped, and a diameter of the outer guiding surface is at least equal to that of the ball, a cross section of the inner guiding surface is also arc-shaped, and a diameter of the inner guiding surface is between a diameter of the spacer and that of the balls, such that inner guiding surface is connected to the outer guiding surface to form the return passage that is oval-shaped in cross section. These two structures all can enable the spacers to pass through the return passage easily.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Figure 1:
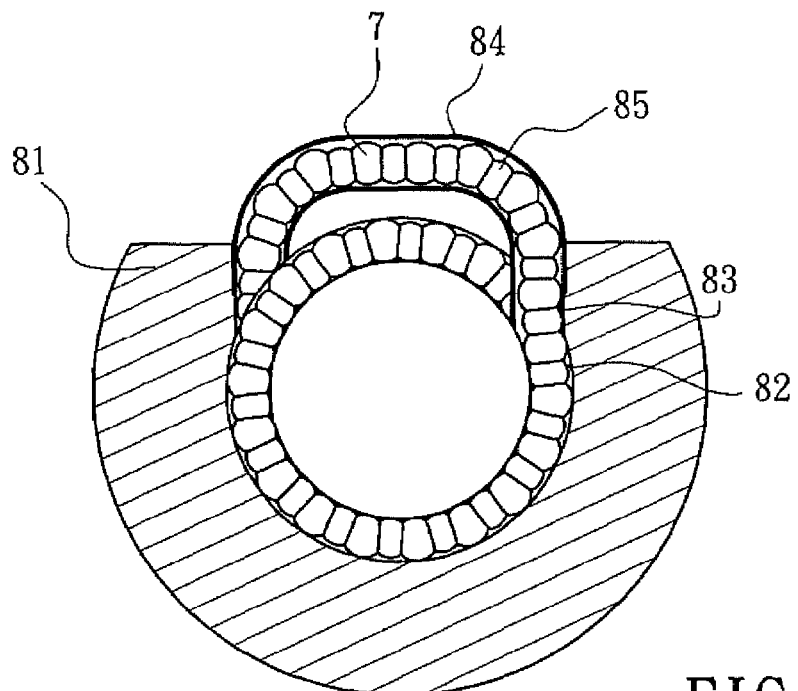
FIG. 1 is an illustrative view of showing an existing structure of an outer circulation ball screw.
Figure 2:
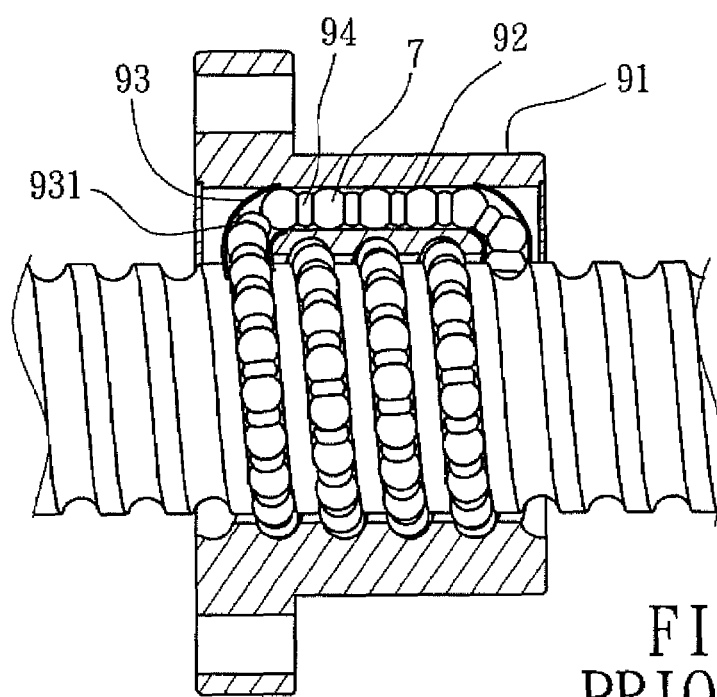
FIG. 2 is an illustrative view of showing an existing structure of an inner circulation ball screw.
Figure 3:
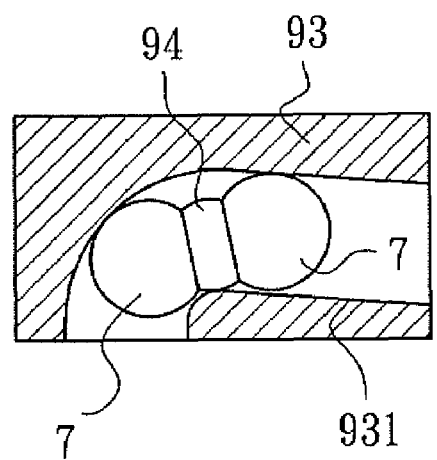
FIG. 3 is an illustrative view of showing that the spacer in the inner circulation ball screw is contacting the inner periphery of the return passage.
Figure 4:
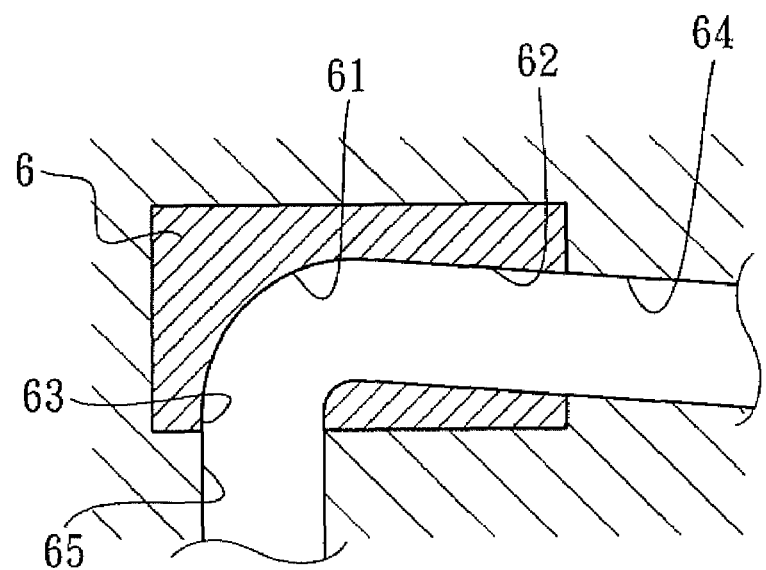
FIG. 4 shows that a return passage of a conventional ball screw is designed in the cassette.
Figure 5:
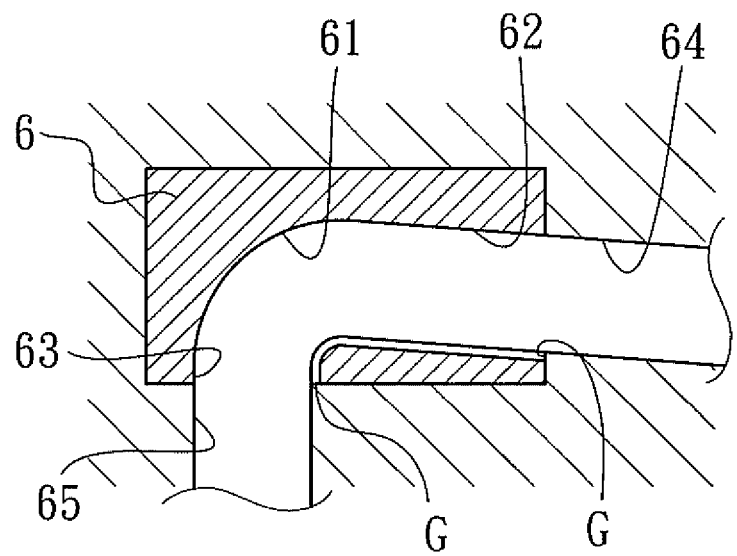
FIG. 5 shows that a level difference occurs between the guide path and the helical groove and the return passage after the inner periphery of the return passage is retracted by the technology of concentric radius reduction.
Figure 6:
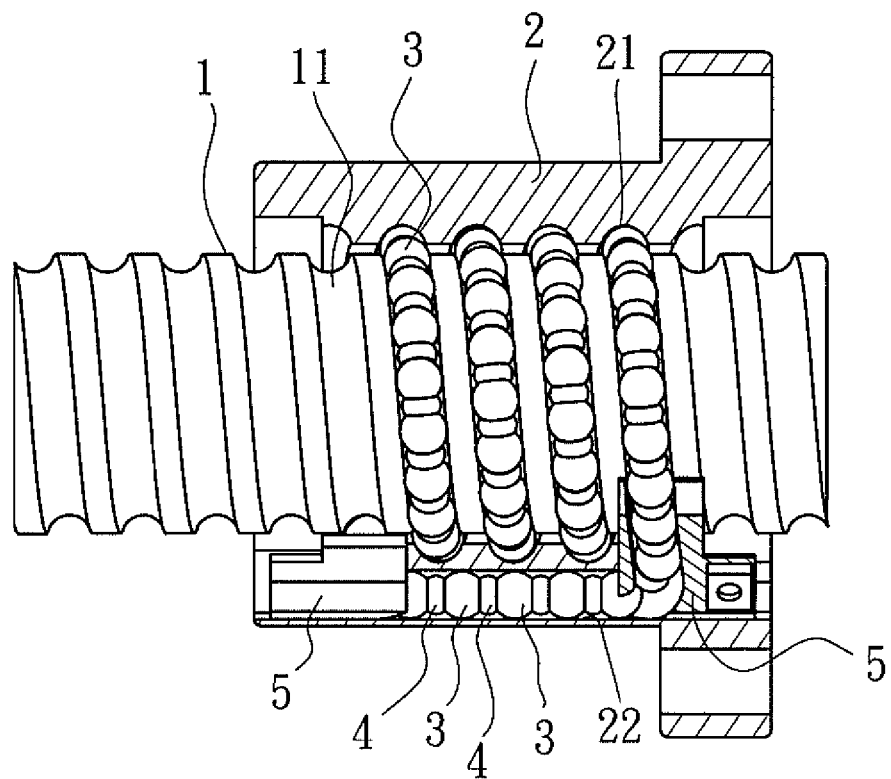
FIG. 6 is an illustrative view of showing a ball screw in accordance with the present invention.
Figure 7:
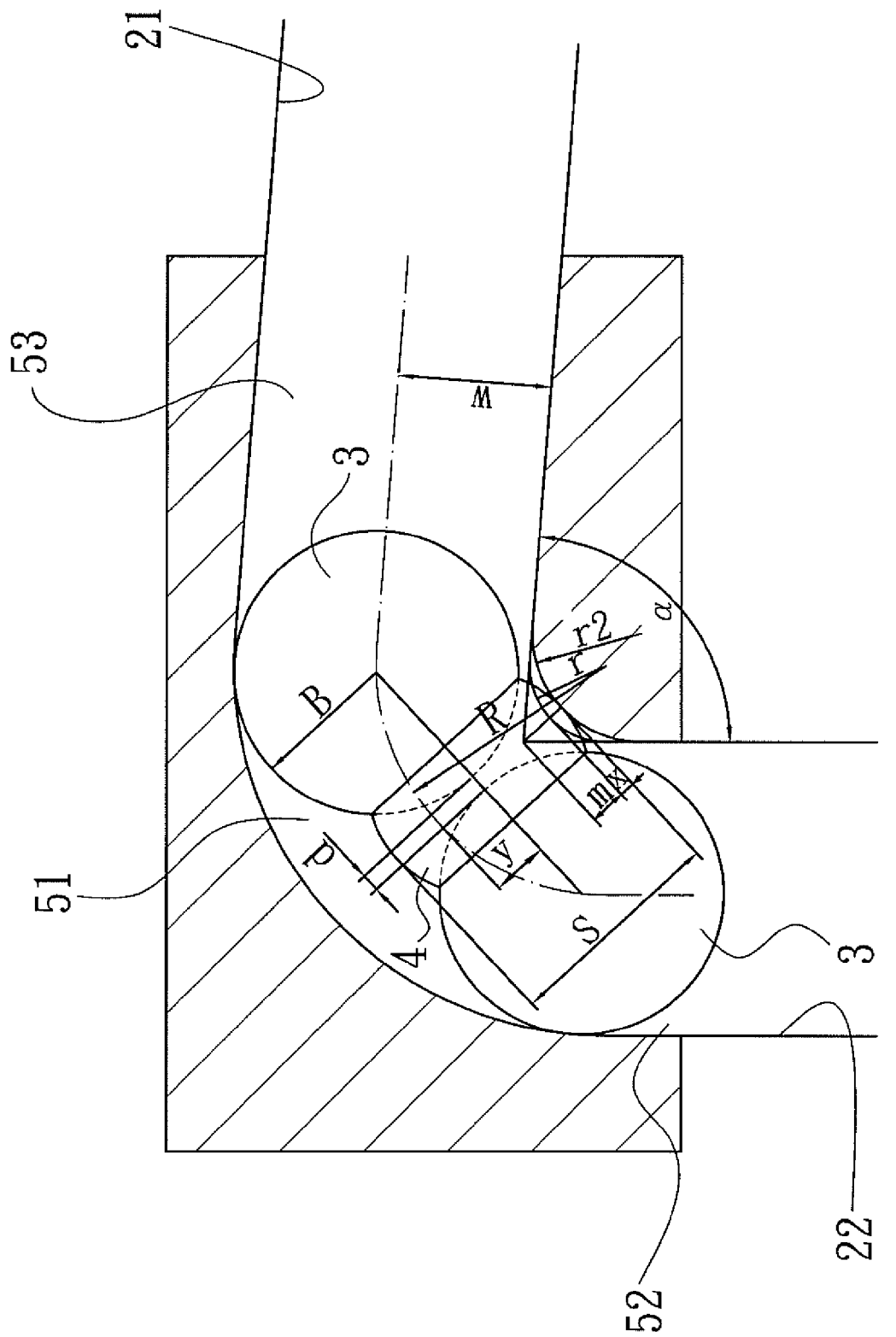
FIG. 7 is an illustrative view of showing a return passage structure ball screw in accordance with the present invention.
Figure 8:
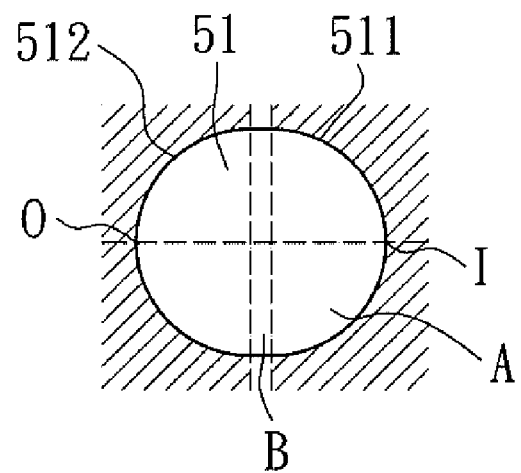
FIG. 8 is a cross sectional view of the return passage ball screw in accordance with the present invention.

Referring to FIGS. 6-8, a ball screw in accordance with a first embodiment of the present invention comprises a screw shaft 1 and a nut 2. The screw shaft 1 and the nut 2 each has a helical groove 11 and 21 for accommodation of a plurality of balls 3 and a plurality of spacers 4 arranged between two neighboring balls 3. A circulation hole 22 is formed in the axial direction of the nut 2, an cassette 5 is arranged at either end of the circulation hole 22, and each of the cassettes 5 has a circulation passage structure for connecting the helical groove 21 and the circulation hole 22, so that the plurality of balls 3 and the spacers 4 can circulate in the nut 2.

Referring to FIG. 7, the circulation passage structure includes a return passage 51 and two linear guiding passages 52 and 53 at both ends of the return passage 51 for connecting the helical groove 21 and the circulation hole 22. The return passage 51 consists of an inner guiding surface 511 and an outer guiding surface 512 (as shown in FIG. 8). The inner guiding surface 511 is connected to an inner curve I, and the outer guiding surface 512 is connected to an outer curve O. The length of the inner curve I is smaller than ½ circumference of the cross section of the return passage, the inner and outer curves are non-concentrically arranged and the center of the inner curve I is located further from the outer curve than a center of the outer curve O (namely the center of the inner curve shifts outward), so that the inner and outer curves are arranged in a non-parallel manner. The cross section of the return passage 51 formed by the inner guiding surface 511 and the outer guiding surface 512 is formed in the shape of an oval-shaped, thus the return passage 51 will have a comparatively large cross section for allowing the spacers 4 to pass through without contacting the inner guiding surface 511.

As shown in FIG. 8, the outer guiding surface 512 is semicircular in cross section, and the diameter of the outer guiding surface 512 at least equals to that of the balls 3. The inner guiding surface 511 is U-shaped in cross section so as to have a semicircular section A and a linear section B. The diameter of the semicircular section A at least equals to that of the balls 3, and the semicircular section A is connected to the outer guiding surface 512 via the linear section B, so that the return passage 51 is elliptical in cross section.

Referring to FIGS. 7 and 8, due to the spacer 4 passes through not in a rolling manner but moves in a manner of being clamped between two balls 3, the spacer 4 in the return passage 51 will be pushed to move inward. In this case, the inner guiding surface 511 of the return passage 51 must retract inward in order not to be impacted by the spacer 4. Our research finds that the amount of inward displacement of the spacer 4 will increase gradually as the spacer 4 approaches the mid of the return passage 51, and it will decrease again as the spacer 4 moves away from the mid of the return passage 51. Therefore, the amount of inward retraction of the inner curve I only need to change in response to the amount of inward displacement of the spacer 4. In other words, using the maximum amount y of inward displacement of the spacer 4 when it is located in the mid of the return passage 51 as a reference for the maximum value of inward retraction of the inner curve I, and taking account of the our diameter of the spacer 4 and the related conditions, then the radius r2 of the inner curve I and the related conditions can be defined as follows:

S: outer diameter of the spacer 4 y: maximum amount y of inward displacement of the spacer w: a distance from the center of the guiding passages 52, 53 of the circulation passage structure to the inner periphery thereof R: a radius of curvature of the center of the original route of the return passage 51

B: radius of the balls 3 d: a thickness of the center of the spacer 4 (the minimum distance between two neighboring spacers)

x: maximum value of inward retraction of the inner curve I r: a radius of curvature of the original inner periphery of the return passage 51;

m: a distance from "r" to the intersection of the guiding passages 52 and 53

α: an angle between the inner peripheries of the guiding passages 52 and 53 r2: a radius of the inner curve I after retraction.

$$y = R - \sqrt{R^2 - \left(\frac{2B+d}{2}\right)^2}$$

$$x = \left[\left(\frac{S}{2} + y\right) - w\right]$$

$$m = r/\sin(\alpha/2)$$

$$\sin(\alpha/2) = r2/(m - r + x) + r2)$$

$$r2 = \frac{(m - r + x) \cdot \sin(\alpha/2)}{1 - \sin(\alpha/2)}$$

The values of r2 and x can be obtained from the abovementioned five equations, wherein x is the maximum value of inward retraction of the inner curve I, namely, the retraction distance of the inner curve I along the angle bisector of the angle between the inner peripheries of the guiding passages 52 and 53. The r2 is the radius of the inner curve I after retraction.

Once knowing the values of r2 and x, the center of the inner curve I can be obtained along the bisector of the angle a, and thus the after-retraction inner curve I can be designed.

By shifting outward the location of the center of the inner curve I and increasing its radius of curvature r2, the degree of curvature of the inner guiding surface 511 connected to the inner curve I can be moderated (the radius of curvature is comparatively small). By such arrangement, the spacer 4 will not contact the inner guiding surface 511 when it is pushed to move inward, and the spacer 4 can pass through the return passage 51 easily without the problem of impacting the return passage.

Figure 9:
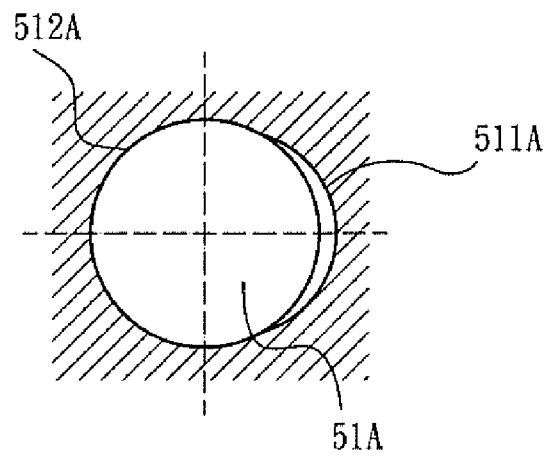
FIG. 9 is a cross sectional view of the return passage ball screw in accordance with a second embodiment of the present invention.

Of course, in addition to the elliptical shape as mentioned in the first embodiment, the cross section of the return passage 51 in accordance with the present invention also can have other shapes. With reference to FIG. 9, a cross section of the return passage in accordance with a second embodiment of the present invention is illustrated, in which, the cross section of the outer guiding surface 512A is arc-shaped, and the diameter of the outer guiding surface 512A is at least equal to that of the ball, so as to facilitate the passage of the balls. The cross section of the inner guiding surface 511A is also arc-shaped, and the diameter of the inner guiding surface 511A is between the diameter of the spacer and that of the balls, such that inner guiding surface 511A can be connected to the outer guiding surface 512A to form a return passage 51A that is oval-shaped in cross section.

Since only the spacer in the return passage is pushed to move inward, only the retracting portion in this embodiment is designed into the cross section that can enable the spacer to pass through, such that it also achieve the same effect of the first embodiment.

While we have shown and described various embodiments in accordance with the present invention, it should be clear to those skilled in the art that further embodiments may be made without departing from the scope of the present invention.

What is claimed is:

1. A circulation passage structure for a ball screw, the ball screw comprising a screw shaft and a nut, the screw shaft and the nut each having a helical groove for accommodation of a plurality of balls and a plurality of spacers arranged between two neighboring balls, a circulation hole formed in an axial direction of the nut, an cassette arranged at either end of the circulation hole;

wherein each of the cassettes comprises a circulation passage structure which includes a return passage and two linear guiding passages at both ends of the return passage for connecting the helical groove and the circulation hole, the return passage includes an inner guiding surface and an outer guiding surface, the inner guiding surface is connected to an inner curve, and the outer guiding surface is connected to an outer curve, a length of the inner curve is smaller than ½ circumference of a cross section of the return passage, the inner and outer curves are non-concentrically arranged and a center of the inner curve is located further from the outer curve than a center of the outer curve, so that the inner and outer curves are arranged in a non-parallel manner, and a cross section of the return passage formed by the inner guiding surface and the outer guiding surface is formed in the shape of an oval, thus the return passage has a comparatively large cross section for allowing the spacers to pass through without contacting the inner guiding surface;

the outer guiding surface is semicircular in cross section, and a diameter of the outer guiding surface at least equals to that of the balls, the inner guiding surface is U-shaped in cross section so as to have a semicircular section and a linear section, a diameter of the semicircular section at least equals to that of the balls, and the semicircular section is connected to the outer guiding surface via the linear section, so that the return passage is elliptical in cross section, and the elliptical cross section of the return passage gradually tapers from its middle portion to both sides thereof.

2. A circulation passage structure for a ball screw, the ball screw comprising a screw shaft and a nut, the screw shaft and the nut each having a helical groove for accommodation of a plurality of balls and a plurality of spacers arranged between two neighboring balls, a circulation hole formed in an axial direction of the nut, an cassette arranged at either end of the circulation hole;

wherein each of the cassettes comprises a circulation passage structure which includes a return passage and two linear guiding passages at both ends of the return passage for connecting the helical groove and the circulation hole, the return passage includes an inner guiding surface and an outer guiding surface, the inner guiding surface is connected to an inner curve, and the outer guiding surface is connected to an outer curve, a length of the inner curve is smaller than ½ circumference of a cross section of the return passage, the inner and outer curves are non-concentrically arranged and a center of the inner curve is located further from the outer curve than a center of the outer curve, so that the inner and outer curves are arranged in a non-parallel manner, and a cross section of the return passage formed by the inner guiding surface and the outer guiding surface is formed in the shape of an oval, thus the return passage has a comparatively large cross section for allowing the spacers to pass through without contacting the inner guiding surface;

wherein a cross section of the outer guiding surface is arc-shaped, and a diameter of the outer guiding surface is at least equal to that of the ball, a cross section of the inner guiding surface is also arc-shaped, and a diameter of the inner guiding surface is between a diameter of the spacer and that of the balls, such that inner guiding surface is connected to the outer guiding surface to form the return passage that is oval-shaped in cross section; and the elliptical cross section of the return passage gradually tapers from its middle portion to both sides thereof.

* * * * *